US00RE42141E

(19) United States
(12) Reissued Patent
Yamamoto et al.

(10) Patent Number: US RE42,141 E
(45) Date of Reissued Patent: Feb. 15, 2011

(54) ELECTRIC DISCHARGE LAMP DEVICE

(75) Inventors: Noboru Yamamoto, Kariya (JP); Yukio Kunieda, Nagoya (JP)

(73) Assignee: DENSO CORPORATION, Kariya (JP)

(21) Appl. No.: 11/699,569

(22) Filed: Jan. 30, 2007

Related U.S. Patent Documents

Reissue of:

(64) Patent No.: 6,853,155
Issued: Feb. 8, 2005
Appl. No.: 10/384,724
Filed: Mar. 11, 2003

(30) Foreign Application Priority Data

Mar. 11, 2002 (JP) ..... 2002-065559
Dec. 24, 2002 (JP) ..... 2002-372516

(51) Int. Cl.
*H05B 37/00* (2006.01)

(52) U.S. Cl. ..... 315/291; 315/307; 315/308

(58) Field of Classification Search ..... 315/224, 315/291, 225, 307, 308, 219, DIG. 5, DIG. 7, 315/82, 209 R
See application file for complete search history.

(56) References Cited

U.S. PATENT DOCUMENTS 4,839,566 A 6/1989 Herold et al.
5,705,897 A 1/1998 Hanazaki et al.

(Continued)

FOREIGN PATENT DOCUMENTS

JP 07-065982 3/1995
JP 7-176388 7/1995

(Continued)

OTHER PUBLICATIONS

Examination Report issued Mar. 20, 2009 in corresponding European Application Nos. 06 124 319.2; 06 124 316.8; 06 124 314.3; and 07 107 748.1.

(Continued)

*Primary Examiner*—David Hung Vu
(74) *Attorney, Agent, or Firm*—Nixon & Vanderhye P.C.

(57) ABSTRACT

An electric discharge lamp device has a lighting start voltage storage circuit for storing a lamp voltage immediately after the start of lighting of a lamp, and a change detection circuit for detecting a change in the lamp voltage by subtracting the lamp voltage immediately after the start of lighting of the lamp from the lamp voltage detected currently. The electric power supplied to the lamp is controlled based upon the change in the lamp voltage.

118 Claims, 9 Drawing Sheets

U.S. PATENT DOCUMENTS

| | | | | |
|---|---|---|---|---|
| 6,163,115 | A | 12/2000 | Ishizuka | |
| 6,608,444 | B2 * | 8/2003 | Minamihata et al. | 315/56 |
| 6,765,355 | B2 | 7/2004 | Matsumoto et al. | |
| 2003/0011326 | A1 | 1/2003 | Noh | |

FOREIGN PATENT DOCUMENTS

| | | |
|---|---|---|
| JP | A-7-176388 | 7/1995 |
| JP | 07-176388 | 7/1995 |
| JP | 8-321389 | 12/1996 |
| JP | 9-7784 | 1/1997 |
| JP | 09-7784 | 1/1997 |
| JP | 9-167692 | 6/1997 |
| JP | 09-167692 | 6/1997 |
| JP | 9-180888 | 7/1997 |
| JP | 2000-82593 | 3/2000 |
| JP | 2001-210485 | 8/2001 |

OTHER PUBLICATIONS

Office Action mailed on Aug. 7, 2007 in corresponding Japanese Application No. 2002–372516.

Extended European Search Report dated Jul. 25, 2007 in corresponding EPC Application No. 07107748.1.

Summons to Oral Proceedings Pursuant to Rule 115(1) EPC issued in corresponding EP Application No. 03005256.7 on Jan. 18, 2008.

Decision of the Technical Board of Appeal of Apr. 4, 2008 in corresponding European Application No. 03005256.7.

ExaminationReports issued on May 5, 2008 in corresponding European application Nos. 06124319.2; 06124318.4; 06124317.6; 06124316.8 and 06124314.3.

Feb. 7, 2007 Communication including Search Report in corresponding European application No. 06124319.2.

Feb. 7, 2007 Communication including Search Report in corresponding European application No. 06124318.4.

Feb. 7, 2007 Communication including Search Report in corresponding European application No. 06124317.6.

Feb. 6, 2007 Communication including Search Report in corresponding European application No. 06124316.8.

Feb. 6, 2007 Communication including Search Report in corresponding European application No. 06124314.3.

May 25, 2007 Decision to Refuse a European Patent Application in corresponding European Application No. 03005256.7.

May 25, 2007 Brief Communication in corresponding European Application No. 03005256.7.

Feb. 2, 2007 Summons to Attend Oral Proceedings in corresponding European Application No. 03005256.7.

Jul. 14, 2006 Communication in corresponding European Application No. 03005256.7.

Mar. 24, 2006 Communication in corresponding European Application No. 03005256.7.

Jul. 29, 2005 Communication in corresponding European Application No. 03005256.7.

Apr. 27, 2004 Communication including Search Report in corresponding European Application No. 03005256.7.

* cited by examiner

ELECTRIC DISCHARGE LAMP DEVICE

Matter enclosed in heavy brackets [ ] appears in the original patent but forms no part of this reissue specification; matter printed in italics indicates the additions made by reissue.

CROSS REFERENCE TO RELATED APPLICATION

The present application relates to and incorporates herein by reference Japanese Patent Applications No. 2002-65559 filed on Mar. 11, 2002 and No. 2002-372516 filed on Dec. 24, 2002.

FIELD OF THE INVENTION

The present invention relates to an electric discharge lamp device for lighting a high-voltage discharge lamp and, particularly, to an electric discharge lamp device suited for use as head lights of vehicles.

BACKGROUND OF THE INVENTION

High-voltage discharge lamps (lamps or bulbs) which are adapted to head lights of vehicles are driven by boosting the voltage of the car-mounted battery into a high voltage through a transformer, changing over the polarities of the high voltage through an inverter circuit, such that the lamps are turned on by an alternating current (JP-A-9-180888 and JP-A-8-321389). The transformer is provided on the primary side thereof with a switching element for controlling the primary current, the switching element being PWM-controlled (pulse width-modulated) based on the lamp voltage and on the lamp current thereby to control the electric power supplied to the lamp. Namely, a desired electric power is supplied to the lamp according to a predetermined control characteristic that specifies a relationship between the lamp voltage and the lamp current.

A lamp which is now adapted to the head light for vehicles is rated at 35 W, a lamp voltage of 85 V and a lamp current of 0.41 A. This lamp contains a trace amount of mercury. From the standpoint of environmental pollution when the lamps are disposed of, it is desired to provide a mercury-less (mercury-free) lamp. The mercury-less lamp requires a lamp voltage in a stable state which is nearly halved compared to that of the conventional counterparts. Further, the lamp voltage in the initial stage of lighting is nearly the same as that of the prior art, and is about 27 V. It further has a feature in that the light flux sharply rises in the initial stage of lighting with a slight increase in the lamp voltage. Therefore, a desired electric power is not obtained by controlling, in a customary manner, the lamp power relying upon the lamp voltage and the lamp current.

To adapt the lamp to the head light for vehicles, the light flux must be quickly increased (quickly brightened) after the lighting switch is turned on. For this purpose, the electric power larger than the rated electric power is supplied to the lamp to quicken the rise of light flux. More specifically, with the presently used 35-W lamp (bulb D2S or D2R), power of about 70 W is supplied to the lamp in the initial stage of lighting, and is then gradually decreased down to 35 W of in the stable state. This control is carried out according to a predetermined control characteristic specifying a relationship between the lamp voltage and the lamp current as shown in FIG. 13. As will be obvious from FIG. 11, the lamp voltage in the initial stage of lighting is about 27 V and is about 85 V in the stable state. The lamp power is decreased from 70 W down to 35 W as the lamp voltage is changed by 58 V from 27 V to 85 V.

Even by using the mercury-less lamp, the light flux must be quickly increased (must be quickly brightened) after the lighting switch is turned on like in the conventional control operation. For this purpose, the electric power larger than the rated power is supplied to the lamp in the initial stage of lighting to quicken the rise of light flux. More specifically, with the mercury-less 35-W lamp, the power of about 90 W must be supplied to the lamp in the initial stage of lighting, and then must be decreased down to 35 W in the stable state. The lamp voltage of the mercury-less lamp in the initial stage of turn-on is about 27 V which is nearly the same as that of the conventional lamp. However, the lamp voltage in the stable state is about 42 V which is about one-half that of the conventional lamp.

If the lamp having the above lamp voltage characteristics is controlled based on the conventional control characteristic shown in FIG. 11, the lamp power may be decreased by 55 W from 90 W down to 35 W depending upon a change of the lamp voltage by 15 V from 27 V to 42 V. Namely, with the conventional lamp, the electric power is decreased by 35 W relative to a change in the voltage of 58 V; i.e., the ratio is small. With the mercury-less lamp, on the other hand, the electric power is decreased by 55 W relative to a change in the voltage of 15 V; i.e., the ratio is large.

The lamp voltage in the initial stage of lighting is about 27 V for both the currently used lamp and the mercury-less lamp, involving a fluctuation of ± several volts. According to the presently employed control method, the fluctuation turns out to be a fluctuation in the lamp power. In the case of the mercury-less lamp, in particular, a change in the lamp voltage from the initial stage of lighting to the stable state is as small as about 15 V while the ratio is large as described above. Accordingly, the fluctuation in the lamp voltage in the initial stage of lighting seriously affects a change in the lamp power. A fluctuation in the lamp voltage until the stable state causes a large fluctuation in the light flux rise characteristics at the time of lighting, making it difficult to satisfy the standardized values specifying the light flux rise characteristics for automobiles.

SUMMARY OF THE INVENTION

It is an object of the present invention to provide an electric discharge lamp device, which can be used with a mercury-less lamp.

According to the present invention, a change in a lamp voltage signal (lamp voltage or its corresponding voltage) is detected by subtracting the lamp voltage signal immediately after the lighting of the lamp from the present lamp voltage signal, and the electric power supplied to the lamp is controlled based on the lamp voltage signal change, making it possible to absorb fluctuation in the lamp voltage due to the individual lamps, to suppress the overshooting and undershooting of the light flux, and to smoothly converge the light flux to 100%. This lamp power control is attained based on the following findings shown in FIGS. 11 and 12. FIG. 11 illustrates a change in the light flux corresponding to the elapse of time from the start of lighting. FIG. 12 illustrates a change in the lamp voltage corresponding to the elapse of time from the start of lighting, wherein fluctuation in the lamp is represented by three bulbs (lamps), i.e., bulb a, bulb b and bulb c. The time axes of FIG. 13 and FIG. 11 are in agreement. In FIGS. 11 and 12, A denotes a period in which 90 W is being supplied to the lamp, and B, C and D denote periods in which the lamp powers are controlled in the bulbs a, b and c depending on ΔVL.

When a constant electric power of about 90 W is supplied to the lamp after the start of lighting in order to quickly increase the light flux, the light flux which was about 50% right after the lighting gradually increases with the elapse of time as shown in FIG. 13, and starts rapidly increasing several seconds later. As the constant power is further continuously supplied, the light flux results in overshooting as indicated by a broken line. Further, the lamp voltages of the bulbs a, b and c in the initial stage of lighting increase while assuming different voltages as shown in FIG. 12.

It is found that changes ΔVL (first changes ΔVL1) in the lamp voltage at a moment when the light flux has reached about 80% to 100% (timing E in FIG. 12) become nearly the same in the bulbs a, b and c having different lamp voltages in the initial stage of lighting, i.e., ΔVLa1≅ΔVLb1≅ΔVLc1. It is further found that whichever bulb is used, the overshooting of the light flux can be prevented upon starting the control operation for decreasing the electric power supplied to the lamp at a moment when the change ΔVL in the lamp voltage has increased to the first change ΔVL1.

In controlling the electric power after the change ΔVL in the lamp voltage has increased to the first change ΔVL1 (ΔVLa1, ΔVLb1, ΔVLc1), it is also found that fluctuation in the lamp voltage due to individual lamps can be absorbed, that the overshooting and undershooting of light flux can be suppressed despite of fluctuation in the lamp voltage and that the light flux can be smoothly converged into 100% by controlling the electric power supplied to the lamp depending upon the change ΔVL which is shifting from the first change ΔVL1 (ΔVLa1, ΔVLb1, ΔVLc1) to the second change ΔVL2 (ΔVLa2, ΔVLb2, ΔVLc2).

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT (First Embodiment)

Figure 1:
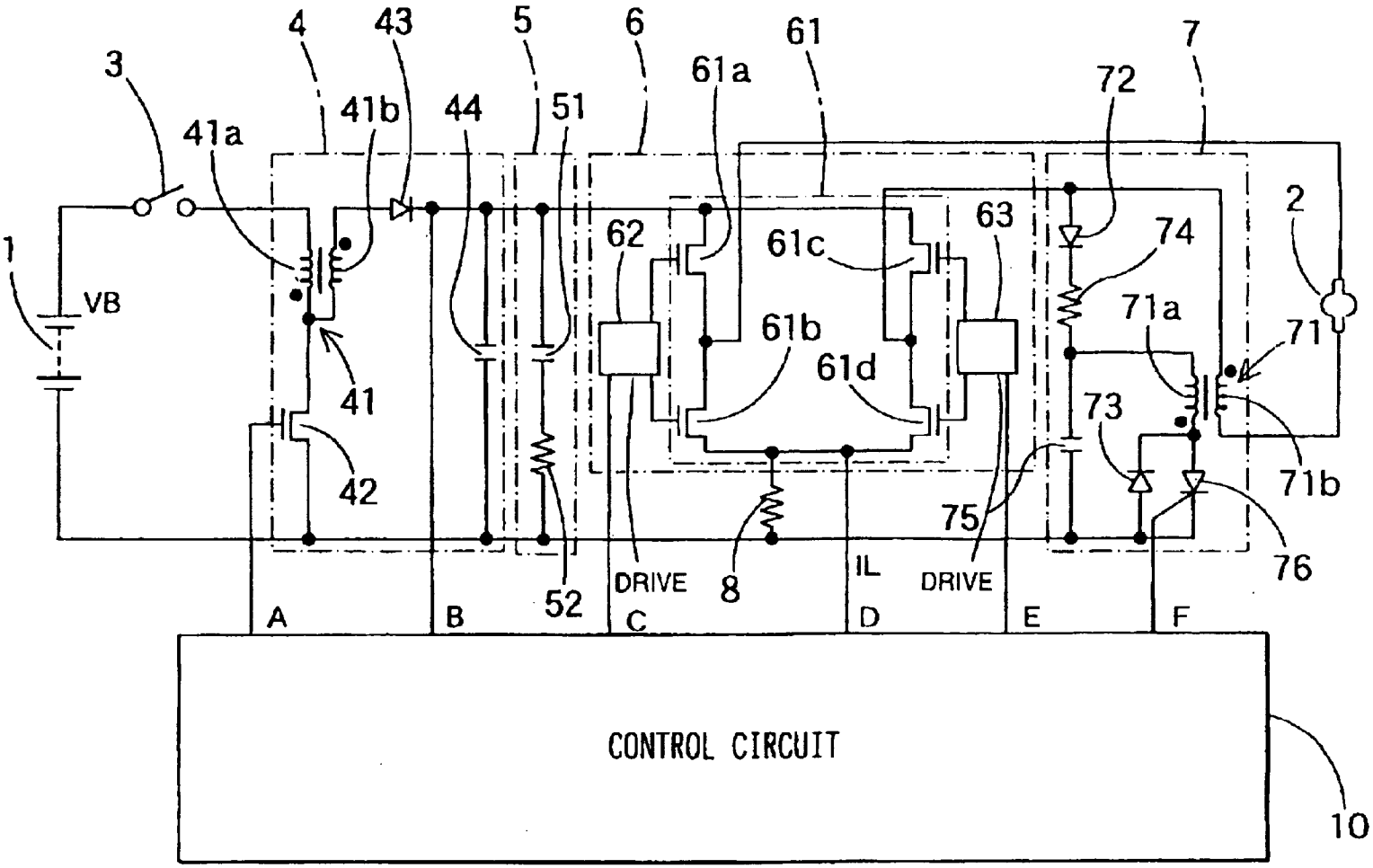
FIG. 1 is a circuit diagram illustrating an electric discharge lamp device according to a first embodiment of the invention.

In FIG. 1, reference numeral 1 denotes a car-mounted battery which is a DC power source, 2 denotes a lamp (high-voltage discharge lamp) which is a head light for vehicles, and 3 denotes a lighting switch for the lamp 2.

The electric discharge lamp device has circuit functional units such as a DC power source circuit (DC-DC converter) 4, a take-over circuit 5, an inverter circuit 6 and a starter circuit 7.

The DC-DC converter 4 is constructed by a fly-back transformer 41 having a primary winding 41a arranged on the side of the battery 1 and a secondary winding 41b arranged on the side of the lamp 2, a MOS transistor 42 connected to the primary winding 41a, a rectifier diode 43 connected to the secondary winding 41b, and a smoothing capacitor 44, and produces a boosted voltage obtained by boosting the battery voltage VB. That is, when the MOS transistor 42 is turned on, an electric current flows into the primary winding 41a whereby energy accumulates in the primary winding 41a. When the MOS transistor 42 is turned off, the energy in the primary winding 41a is supplied to the secondary winding 41b. Upon repeating this operation, a high voltage is out put from a point where the diode 43 and the capacitor 44 are connected together.

The take-over circuit 5 is constructed by a capacitor 51 and a resistor 52, and permits the lamp 2 to be quickly shifted into arc discharge from the dielectric breakdown across the electrodes as the capacitor 51 is electrically charged after the lighting switch 3 is turned on.

The inverter circuit 6 is to drive the lamp 2 with alternating current, and is constructed by an H-bridge circuit 61 and bridge drive circuits 62, 63. The H-bridge circuit 61 is constructed by MOS transistors 61a to 61d which are semiconductor switching elements arranged like an H-bridge. Upon receipt of signals from an H-bridge control circuit 400 that will be described later, the bridge drive circuits 62 and 63 turn the MOS transistors 61a, 61d and the MOS transistors 61b, 61c on and off alternately. As a result, the direction of the discharge current in the lamp 2 is changed over alternately, whereby the polarities of the voltage (discharge voltage) applied to the lamp 2 are inverted to turn on the lamp 2 with an alternating current.

The starter circuit 7 is arranged between the neutral potential point of the H-bridge circuit 61 and the negative terminal of the battery 1, is constructed by a transformer 71 having a primary winding 71a and a secondary winding 71b, diodes 72, 73, a resistor 74, a capacitor 75 and a thyristor 76, and works to turn the lamp 2 on. Namely, when the lighting switch 3 is turned on, the capacitor 75 starts being electrically charged. Then, as the thrystor 76 is turned on, the capacitor 75 starts discharging, and a high voltage is applied to the lamp 2 through the transformer 71. As a result, dielectric breakdown occurs across the electrodes, and the lamp 2 turns on.

The above MOS transistor 42, bridge drive circuits 62, 63, and thyristor 76 are controlled by a control circuit 10. The control circuit 10 is supplied with a lamp voltage across the DC-DC converter 4 and the inverter circuit 6 (i.e., a voltage applied to the inverter circuit 6) and a lamp current IL that flows into the negative pole side of the battery 1 from the inverter circuit 6. The lamp current IL is detected as a voltage by a resistor 8 that detects the current.

Figure 2:
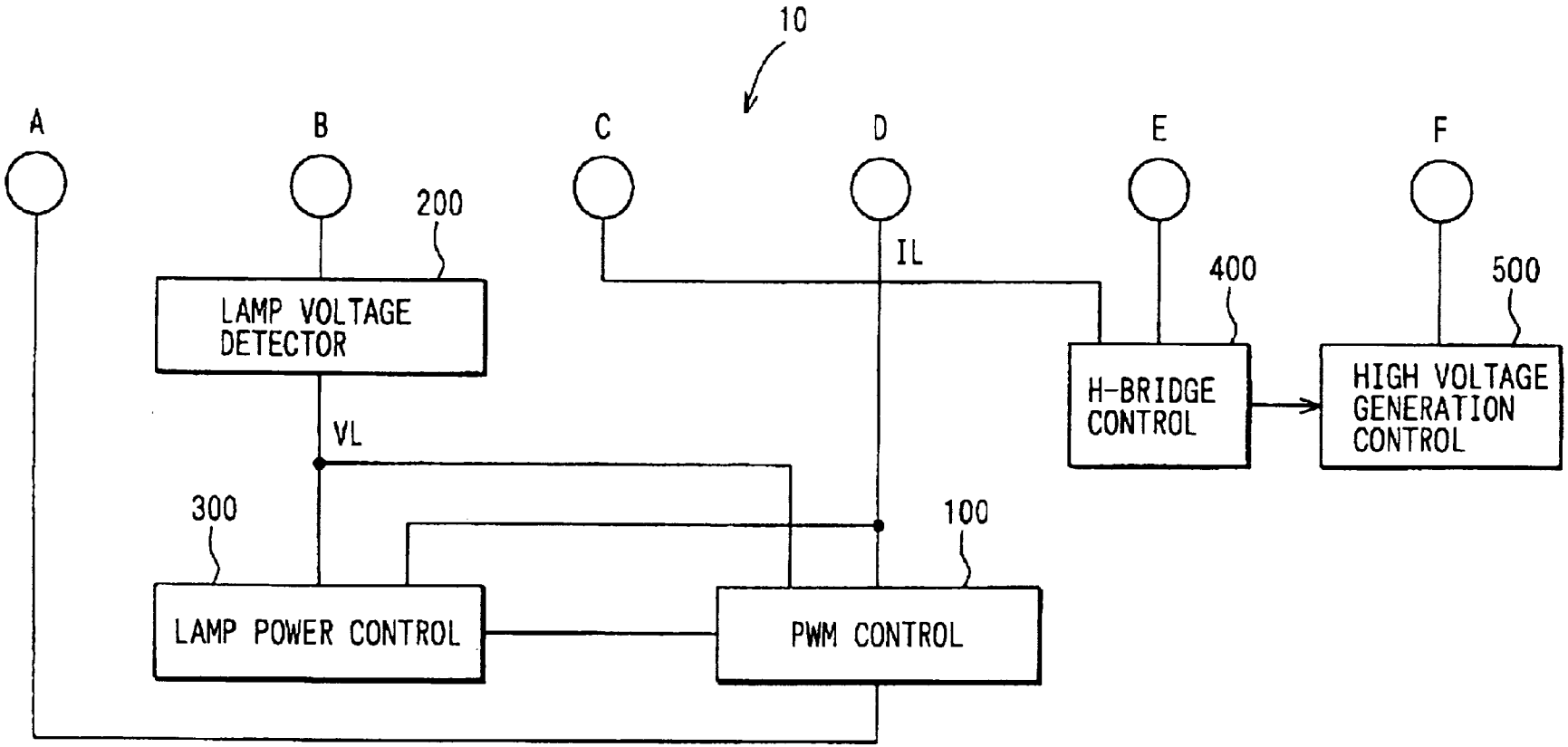
FIG. 2 is a block diagram illustrating a control circuit shown in FIG. 1.

FIG. 2 illustrates a block construction of the control circuit 10. The control circuit 10 is constructed by a PWM control circuit 100 that turns the MOS transistor 42 on and off in response to PWM signals, a lamp voltage detector circuit 200 that converts the lamp voltage into a lamp voltage VL for a signal, a lamp power control circuit 300 which receives the lamp voltage VL and the lamp current IL and controls the lamp power to a desired value, an H-bridge control circuit 400 for controlling the H-bridge circuit 61, and a high voltage generation control circuit 500 for turning the thyristor 76 on to generate a high voltage for the lamp 2.

When the lighting switch 3 is turned on, the electric power is supplied to every portion shown in FIG. 1. The PWM control circuit 100 PWM-controls the MOS transistor 42. As a result, due to the operation of the fly-back transistor 41, a voltage obtained by boosting the battery voltage VB is output from the DC-DC converter 4. Further, the H-bridge control circuit 400 works to turn the MOS transistors 61a to 61d in the H-bridge circuit 61 on and off alternately relying upon a relationship of diagonal lines. Therefore, a high voltage output from the DC-DC converter 4 is supplied to the capacitor 75 in the starter circuit 7 through the H-bridge circuit 61, and the capacitor 75 is electrically charged.

Thereafter, based on a signal representing the timing for changing over the MOS transistors 61a to 61d output from the H-bridge control circuit 400, the high voltage generation control circuit 500 sends a gate drive signal to the thyristor 76 to turn the thyristor 76 on. As the thyristor 76 is turned on, the capacitor 75 discharges and a high voltage is applied to the lamp 2 through the transformer 71. As a result, dielectric breakdown occurs across the electrodes, and the lamp 2 is turned on.

Then, the polarities of the discharge voltage to the lamp 2 (directions of the discharge current) are alternately changed over by the H-bridge circuit 61 to turn on the lamp 2 with the alternating current. Further, the lamp power control circuit 300 so controls the lamp power to assume a desired value to maintain the lamp 2 turned on. The lamp voltage detector circuit 200 receives the voltage applied to the inverter circuit 6 as a lamp voltage and converts it into a lamp voltage VL which serves as a voltage.

Next, a detailed construction of the lamp power control circuit 300 will be described with reference to FIG. 3.

The lamp power control circuit 300 is such that the PWM control circuit 100 receives an output of an error amplifier circuit 301 that produces an output corresponding to the lamp voltage VL and the lamp current IL, that are signals representing the lighting state of the lamp 2. The PWM control circuit 100 increases the duty ratio for turning the MOS transistor 42 on/off with an increase in the output voltage from the error amplifier circuit 301, thereby to increase the lamp power.

A lighting start voltage storage circuit (lighting start voltage storage means) 320 stores a lamp voltage VL immediately after the lighting of the lamp and produces the stored lamp voltage VLs.

A change detection circuit 350 subtracts the lamp voltage VLs stored in the lighting start voltage storage circuit 320 from the lamp voltage VL, detects a change ΔVL in the lamp voltage from the voltage (VLs) in the initial stage of lighting, and produces a change ΔVL in the lamp voltage.

A reference voltage Vr1 is input to a non-inverting input terminal of the error amplifier circuit 301, and a voltage V1 that serves as a parameter for controlling the lamp power is input to an inverting input terminal thereof. The error amplifier circuit 301 produces a voltage corresponding to a difference between the reference voltage Vr1 and the voltage V1. This voltage V1 is determined based upon a lamp current IL, a constant current i1, a current i2 set by a first current-setting circuit 302, a current i3 set by a second current-setting circuit 303, a current i4 set by a third current-setting circuit 304, and a current i5 set by a fourth current-setting circuit 305. Here, the sum of the currents i1, i2, i3, i4 and i5 is set to be sufficiently smaller than the lamp current IL.

Figure 3:
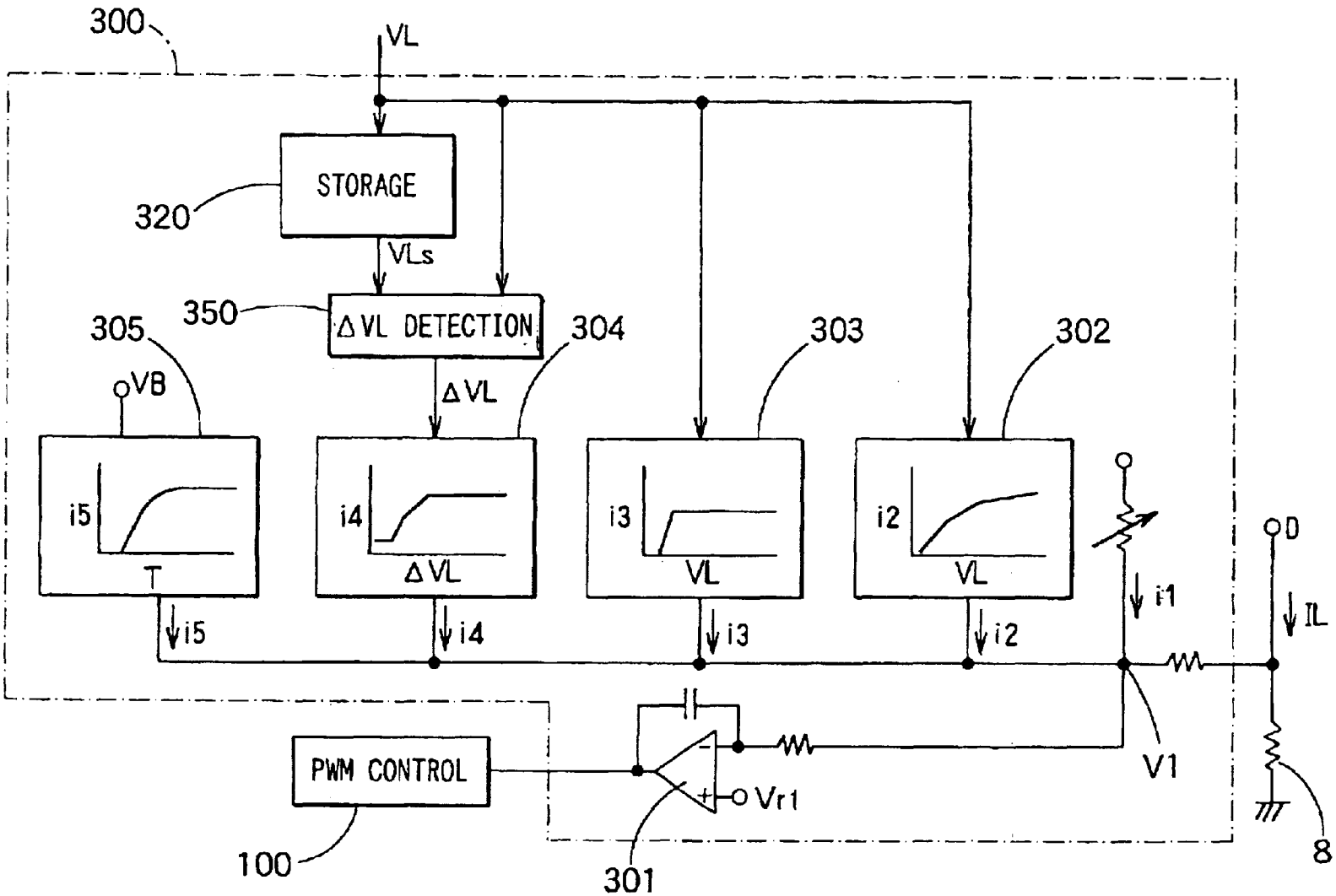
FIG. 3 is a block diagram illustrating a lamp power control circuit shown in FIG. 2.

Here, the first current-setting circuit 302 permits the current i2 to increase with an increase in the lamp voltage VL as shown in FIG. 3. The second current-setting circuit 303 sets the current i3 to be zero when the lamp voltage VL is not larger than a first predetermined value, sets i3 to assume a constant value when VL is not smaller than a second predetermined value, and permits i3 to increase as VL increases in excess of the first predetermined value but not larger than the second predetermined value as shown in FIG. 3.

The third current-setting circuit 304 sets the current i4 to assume a constant value when a change in the lamp voltage VL for the lamp voltage in the initial stage of lighting is not larger than a first predetermined value, i.e., when a change ΔVL in the lamp voltage is not larger than the first predetermined voltage, sets i4 to assume a constant value when it is not larger than a second predetermined value, and permits i4 to increase with an increase in the change ΔVL in a range of not smaller than the first predetermined value but not larger than the second predetermined value. As shown in FIG. 3, the fourth current-setting circuit 304 permits the current i5 to increase with an increase in the elapse of time T after the lighting, and sets i5 to assume a constant value after several tens of seconds have passed from the start of lighting.

The lamp power circuit 300 produces a voltage corresponding to the lamp voltage VL, lamp current IL and change ΔVL in the lamp voltage for the elapse of time T after the lighting to control the lamp power, increases the lamp power (e.g., 90 W) in the initial stage of lighting to quickly increase the light flux from the lamp (to quickly brighten), gradually lowers the lamp power with the rise of the light flux, and controls the lamp power to a predetermined value (e.g., 35 W) as the lamp 2 is put into the stable state.

Figure 4:
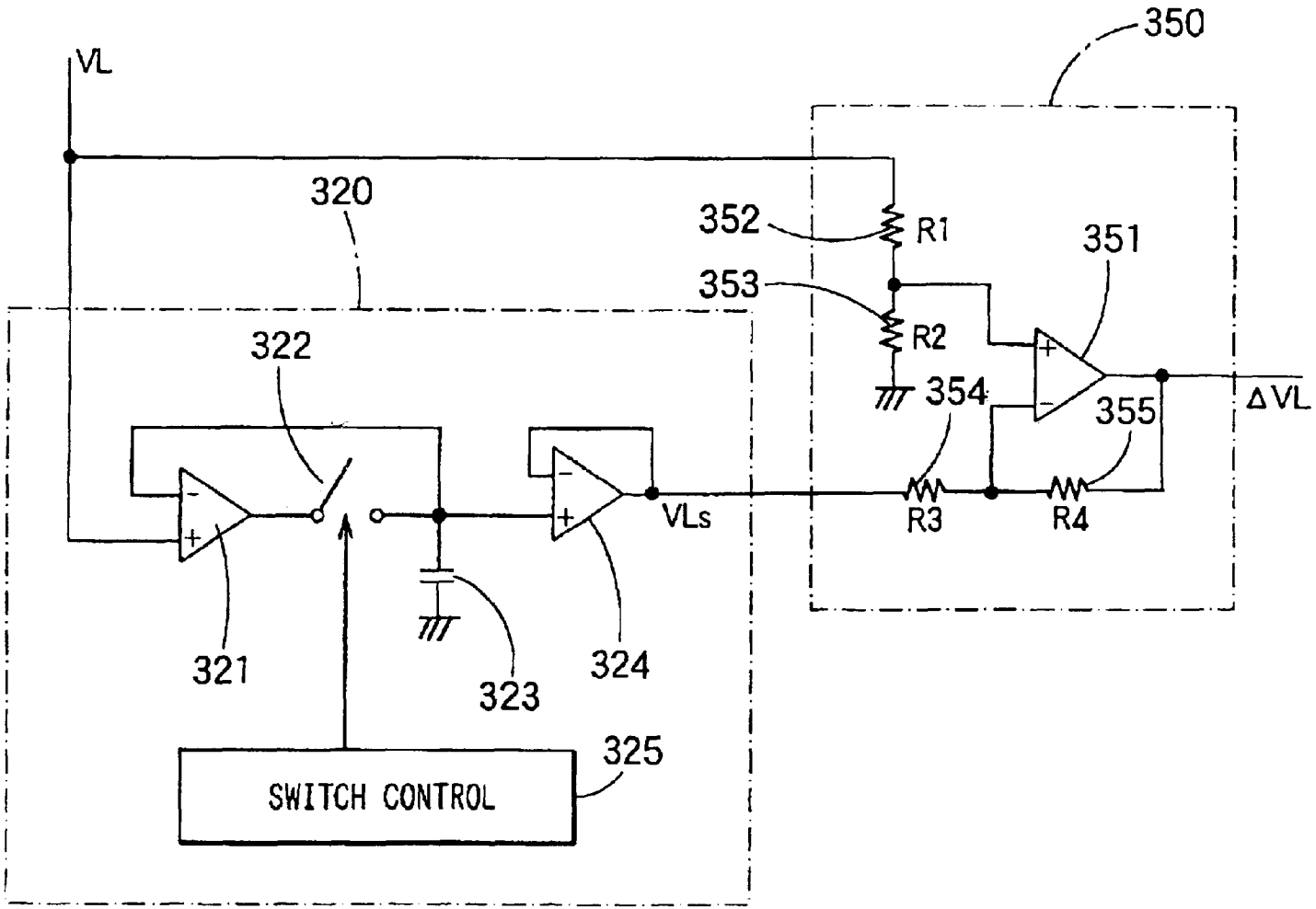
FIG. 4 is a circuit diagram illustrating a lighting start voltage storage circuit and a change detection circuit shown in FIG. 3.

Next, specifically described below with reference to FIG. 4 are the constructions of the lighting start voltage storage circuit 320 and the change detection circuit 350.

The lighting start voltage storage circuit 320 is constructed with a sample-holding circuit including an operational amplifier 321, a switch 322 and a capacitor 323, and by a switch control circuit 325 which controls the opening/closure of the switch 322, and an operational amplifier 324 constituting a voltage follower circuit that impedance-converts the output voltage of the sample-holding circuit.

The lamp voltage VL is input to the non-inverting input terminal of the operational amplifier 321. In a state where the switch 322 is turned on, the capacitor 323 is so controlled as to assume a voltage which is the same as the lamp voltage VL. When the switch 322 is turned off, the charging voltage of the capacitor 323 is held (stored) at the voltage charged in the capacitor 323 at the moment of turn-off, and is maintained unchanged until the switch 322 is turned on.

Upon detecting the start of lighting, the switch control circuit 325 maintains the switch 322 turned on until a predetermined period of time elapses from the start of lighting and, after the elapse of the predetermined period of time, forms a switch control signal for controlling the switch 322 to be turned off.

Next, a detailed construction of the current setting circuit 305 which is a timer circuit and its operation will be described with reference to FIGS. 5, 7 and FIGS. 6, 8. Here, FIGS. 5 and 6 pertain to a first embodiment, and FIGS. 7 and 8 pertain to a second embodiment.

Figure 5:
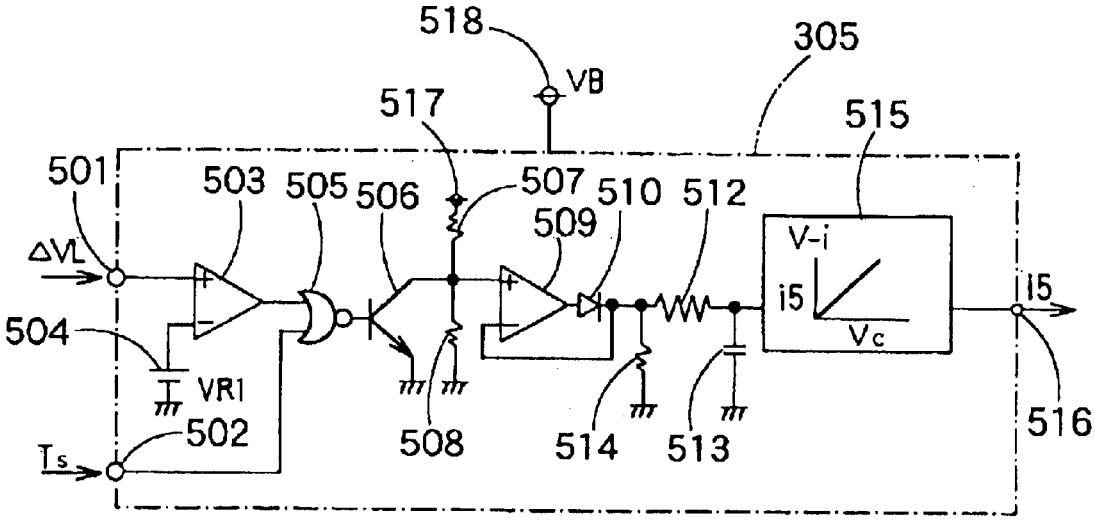
FIG. 5 is a circuit diagram illustrating a current-setting circuit which is a timer circuit shown in FIG. 3.

In FIG. 5, the comparator 503 compares the change ΔVL in the lamp voltage at a terminal 501 with a reference voltage VR1 of a reference voltage source 504, and produces an output of the high level when ΔVL is larger than VR1. A terminal 502 receives a signal TS that inverts into the high level from the low level after the elapse of a predetermined period of time from the start of lighting. The above predetermined period of time has been set depending upon the turn-off time of before the lighting; i.e., the predetermined period of time is set to be long when the turn-off time is long or at the time of cold start, and is set to be short when the turn-off time is short or at the time of hot start.

A NOR gate 505 takes a logic of the output of the comparator 503 and a signal TS, and drives a transistor 506. A constant voltage is applied to a terminal 517. A voltage Va is input to a non-inverting input of an operational amplifier 509. When the transistor 506 is interrupted, Va becomes a partial voltage obtained by dividing the above constant voltage by the resistors 507 and 508. When the transistor 506 is rendered conductive, on the other hand, Va becomes almost 0 V since the voltage drop is small between the collector and the emitter of the transistor 506. The operational amplifier 509 and a diode 510 form a mono-directional buffer circuit which controls the output voltage to become equal to the voltage Va only when the voltage on the cathode side of the diode 510 is lower than Va.

When the transistor 506 is in an interrupted state, Va becomes the partial voltage as described above. The partial voltage Va is applied to a time constant circuit constructed with a resistor 512, a capacitor 513 and a resistor 514 through the operational amplifier 509 and the diode 510, and the capacitor 513 is electrically charged through the resistor 512. A voltage Vc for charging the capacitor 513 becomes equal to Va after the elapse of a predetermined period of time from the start of charging, the predetermined period of time being determined by a time constant CR with an electrostatic capacity C of the capacitor 513 and a resistance R of the resistor 512 as parameters.

On the other hand, when the transistor 506 is in the conducting state, Va becomes nearly 0 V as described above, and the electric charge stored in the capacitor 513 is discharged through the resistors 512 and 514.

Thus, the capacitor 513 is electrically charged and discharged depending upon whether the transistor 506 is rendered conductive or interrupted. The capacitor 513 is electrically charged through the diode 510 and the resistor 512, and is discharged through the resistors 512 and 514.

The charging voltage Vc is input to a V-I conversion circuit 515 which converts Vc into a current i5 which is proportional to the voltage Vc, and i5 is output from a terminal 516. A terminal 518 is a power source supply terminal of the timer circuit 305.

Figure 6:
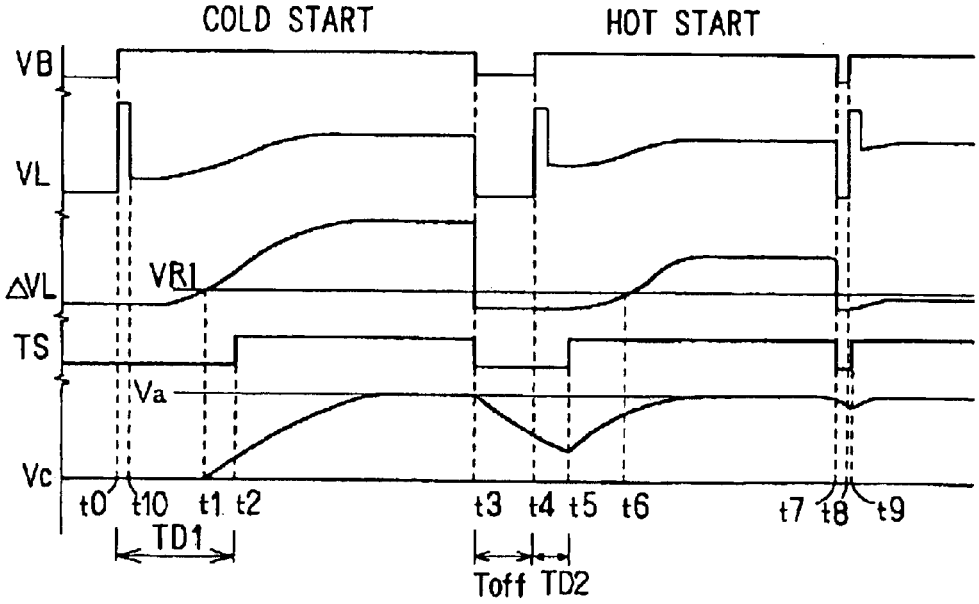
FIG. 6 is a signal diagram illustrating the operation of the current-setting circuit shown in FIG. 5.
Figure 7:
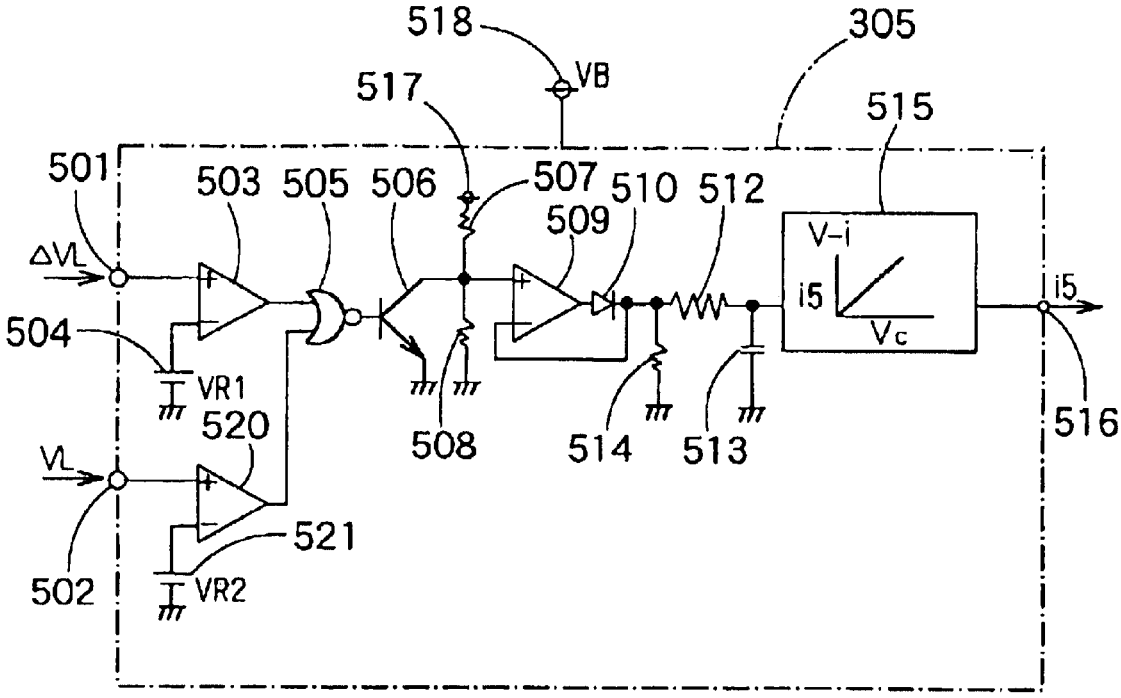
FIG. 7 is a circuit diagram illustrating a current-setting circuit which is a timer circuit used in an electric discharge lamp device according to a second embodiment of the present invention.

FIG. 6 shows waveforms of each of the portions at the time of cold start and hot start.

At cold start, when the power source circuit of the electric discharge lamp device is closed at a timing t0, the electric discharge lamp device starts operating, the lighting starts at a timing t10, and the lamp voltage VL largely decreases instantaneously. After the start of lighting, the change ΔVL in the lamp voltage gradually increases with the elapse of time. When the change ΔVL reaches the reference voltage VR1 at a timing t1, the output of the comparator 503 is inverted into the high level, the transistor 506 is switched from the conductive state over to the interrupted state, the partial voltage Va is applied to the time constant circuit, and the capacitor 513 starts being electrically charged. As the electric charging starts, the charging voltage Vc gradually increases based on the time constant CR. After the start of electric charging, the signal TS is inverted into the high level at a timing t2 of when a time TD1 has passed from the timing t0. However, the transistor 506 is still maintained in the interrupted state, and the capacitor 513 continues to be electrically charged. When a predetermined period of time determined by the time constant CR passes from the start of electric charging, Vc becomes the same as Va, which is maintained unchanged thereafter.

Thus, the charging voltage Vc gradually increases based on the time constant CR from the timing t1 where the change ΔVL in the lamp voltage has been increased to the reference voltage VR1 which is a predetermined value, and becomes equal to Va and remains constant from the time when the predetermined period of time determined by the time constant CR has elapsed. The current i5 which is proportional to Vc is output from the terminal 516, and the electric power supplied to the lamp gradually decreases with the elapse of time.

Then, when the power source circuit is turned off at a timing t3, the electric discharge lamp device is turned off. When the power source is interrupted, further, the capacitor 513 starts discharging through the resistors 512 and 514. The electric discharge from the capacitor 513 is conducted based on a time constant CR' determined by the electrostatic capacity C of the capacitor 513 and a series resistance R' of the resistors 512 and 514.

When the power source circuit is turned on at a timing t4 of before the electric discharge of the capacitor 513 is completed, the electric discharge lamp device starts lighting similarly to that of cold starting.

At the hot start, the lamp voltage VL immediately after the lighting is higher than that of at the cold start, and gradually increases from this state with the elapse of time and reaches the voltage of in the stable state. Namely, VL rises mildly compared to that of at the cold start, and the change ΔVL in the lamp voltage increases mildly. Accordingly, the time from the start of lighting until the timing t6 where the change ΔVL reaches the predetermined value VR1 becomes longer than that of at the cold start.

On the other hand, the time until the signal TS is inverted to the high level is set depending upon the time Toff, and is set to be a long time TD1 at the time of cold start and is set to be a short time TD2 at the time of hot start. Therefore, the signal TS is inverted into the high level at a timing t5 of before the change ΔVL reaches the predetermined value VR1. At the timing t5, therefore, the output of the NOR gate 505 is inverted into the low level, the transistor 506 is switched from the conductive state over to the interrupted state, the partial voltage Va is applied to the time constant circuit, and the capacitor 513 is changed from the discharging operation over to the charging operation. After the start of charging, the charging voltage Vc gradually increases based on the time constant CR.

Then, Vc becomes the same as Va after the elapse of a predetermined period of time determined by the above time constant CR from the start of charging and is, then, maintained at this value.

Thus, the charging voltage Vc gradually increases based on the time constant CR from the voltage at the timing t5 where the signal TS has inverted into the high level, and becomes equal to Va and is maintained constant after the elapse of a predetermined period of time determined by the time constant CR. The current i5 proportional to Vc is out put from the terminal 516, and the electric power supplied to the lamp gradually decreases with the elapse of time.

Further, the power source circuit is turned off at a timing t7 to turn off and is turned on again at a timing t8 to hot-start the lighting again. In this case, the time Toff is further shortened and the lighting is effected again in a state where the electrode temperature of the lamp has not been almost lowered. Therefore, the lamp voltage VL immediately after the lighting is close to the voltage in the stable state, and the change ΔVL in the lamp voltage does not reach the predetermined value VR1. However, since the signal TS inverts into the high level at a timing t9 immediately after the re-lighting, the capacitor 513 starts being electrically charged. The charging voltage Vc for the capacitor 513 is close to a constant value at the timing t9. Therefore, Vc rises to the predetermined value within a short period of time.

In the above timer circuit 305, the time TD2 from the start of lighting at hot starting until when the signal TS is inverted into the high level is set as the time corresponding to the length of turn-off time Toff of before the lighting. However, since the capacitor 513 undergoes the discharging operation within the turn-off time Toff, the charging voltage Vc of the capacitor 513 at the start of lighting corresponds to the turn-off time Toff. Therefore, when Vc at the start of lighting is larger than the predetermined value, the capacitor 513 may be electrically charged irrespective of the change ΔVL in the lamp voltage.

In this case, at the cold start, the capacitor 513 starts being electrically charged at a moment when ΔVL has reached the predetermined value. At the hot start where the turn-off time Toff is short, the capacitor 513 starts being electrically charged nearly simultaneously with the closure of the power source circuit.

(Second Embodiment)

The second embodiment is similar to the first embodiment with the exception of comparing the lamp voltage VL input to the terminal 519 from the comparator 520 with the reference voltage VR2 (predetermined value) of the reference voltage source 521, and using a signal representing whether VL is larger than the predetermined value instead of using the signal TS.

Figure 8:
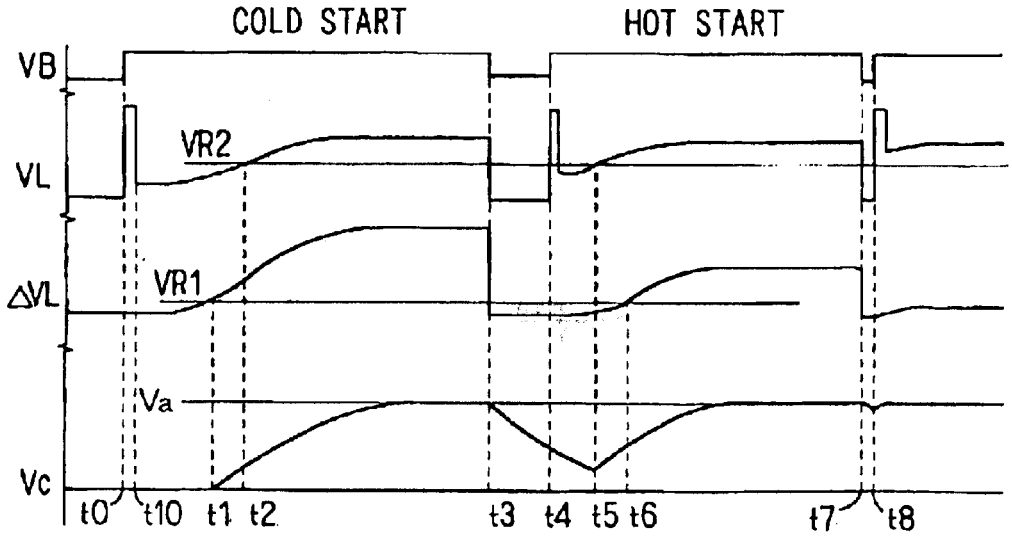
FIG. 8 is a signal diagram illustrating the operation of the current-setting circuit shown in FIG. 7.

FIG. 8 shows the waveforms at each of the portions at cold start and at hot start. At hot start, therefore, the capacitor 513 is changed from the discharging operation over to the charging operation at the timing t5 where the lamp voltage VL reaches the predetermined value VR2.

Figure 9:
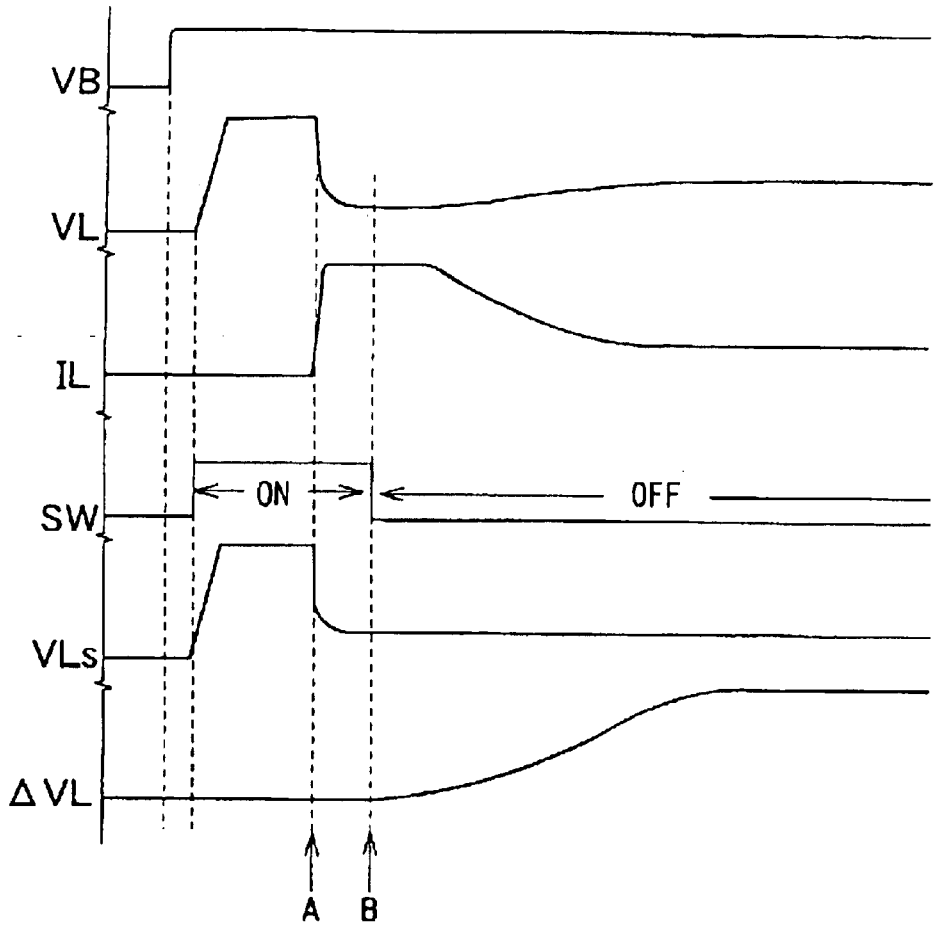
FIG. 9 is a signal diagram illustrating signals developed in the electric discharge lamp device shown in FIG. 1.

FIG. 9 shows waveforms at each of the portions. In FIG. 9, VB denotes a power source voltage applied to the device, VL denotes a lamp voltage, IL denotes a lamp current, SW denotes on/off state of the switch 322, VLs denotes an output voltage of the lighting start voltage storage circuit 320, and ΔVL denotes an output voltage of the change detection circuit 350.

The device starts operating when the power source (VB) is applied thereto. A timing A represents the start of lighting. At a timing B after the elapse of a predetermined period of time from the timing A, the switch 322 is changed from the ON state over to the OFF state. At the timing B, VLs is held (stored) as the voltage in the initial stage of lighting.

The Δchange detection circuit 350 is a subtraction circuit constructed with an arithmetic amplifier 351 and resistors 352 to 355. Here, if R1=R3 and R2=R4, then, $$\Delta VL=(VL-VLs)\times R2/R1$$

which is a change ΔVL in the lamp voltage from the voltage VLs in the initial stage of lighting.

Ideally, the voltage VLs in the initial stage of lighting is the lamp voltage of when the light flux is the smallest (dark). Accordingly, the predetermined period of time until the switch 322 is turned off which is determined by the above switch control circuit 325, is set when the light flux is the smallest, and is not longer than 6 seconds from the start of lighting.

Figure 10:
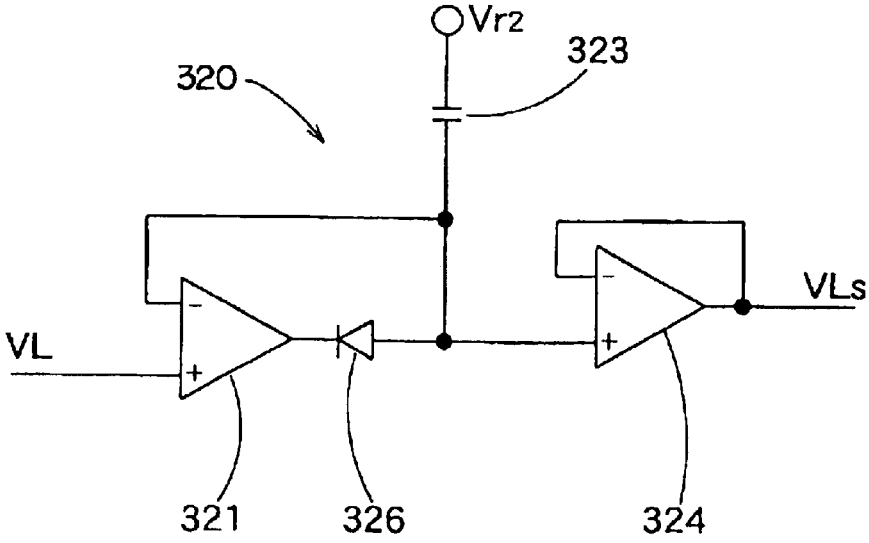
FIG. 10 is a circuit diagram illustrating a modification of the lighting start voltage storage circuit shown in FIG. 3.
Figure 11:
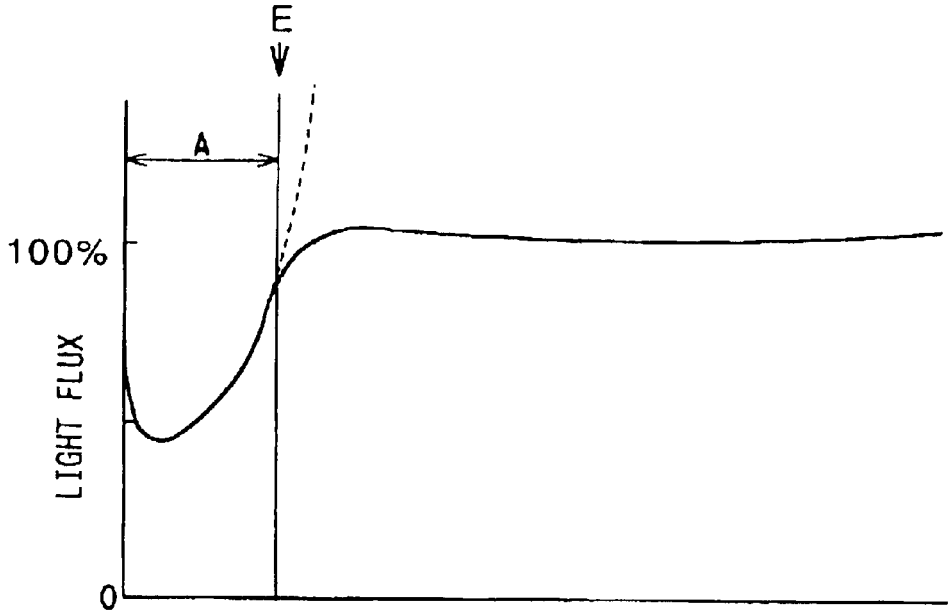
FIG. 11 is a graph illustrating light flux change.
Figure 12:
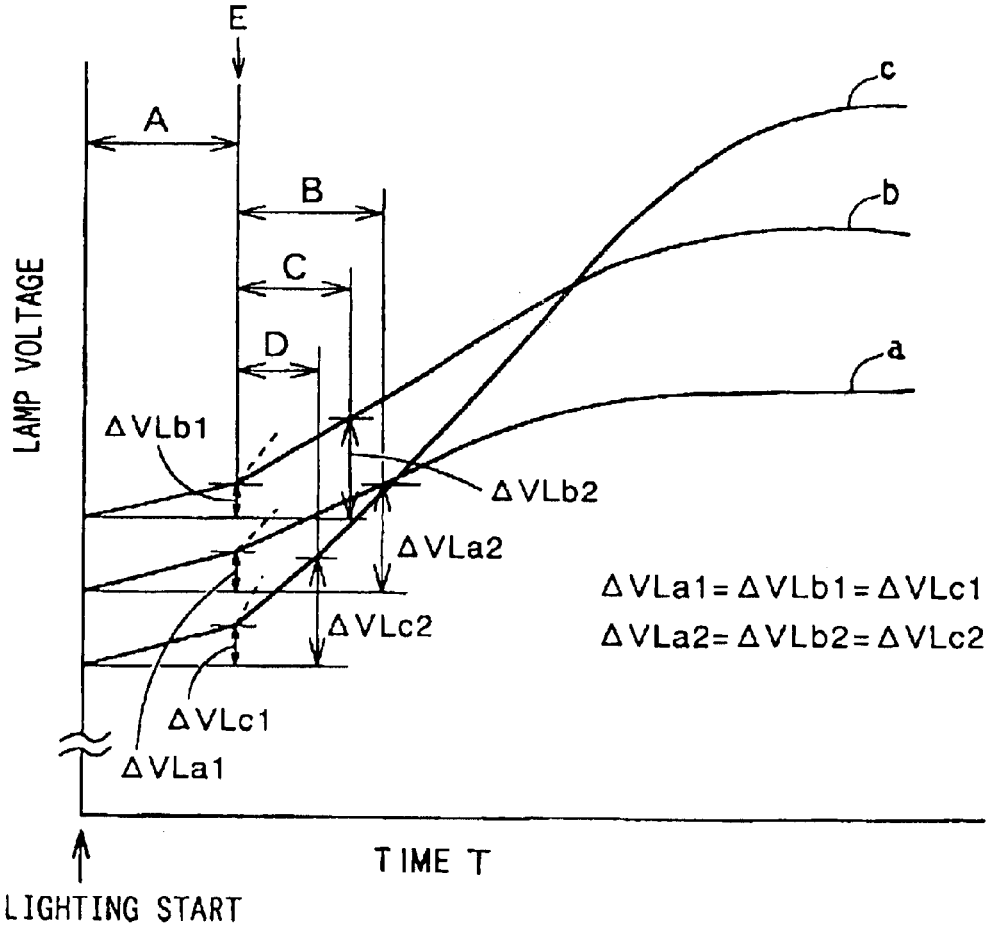
FIG. 12 is a graph illustrating lamp voltage changes with respect to various lamps.
Figure 13:
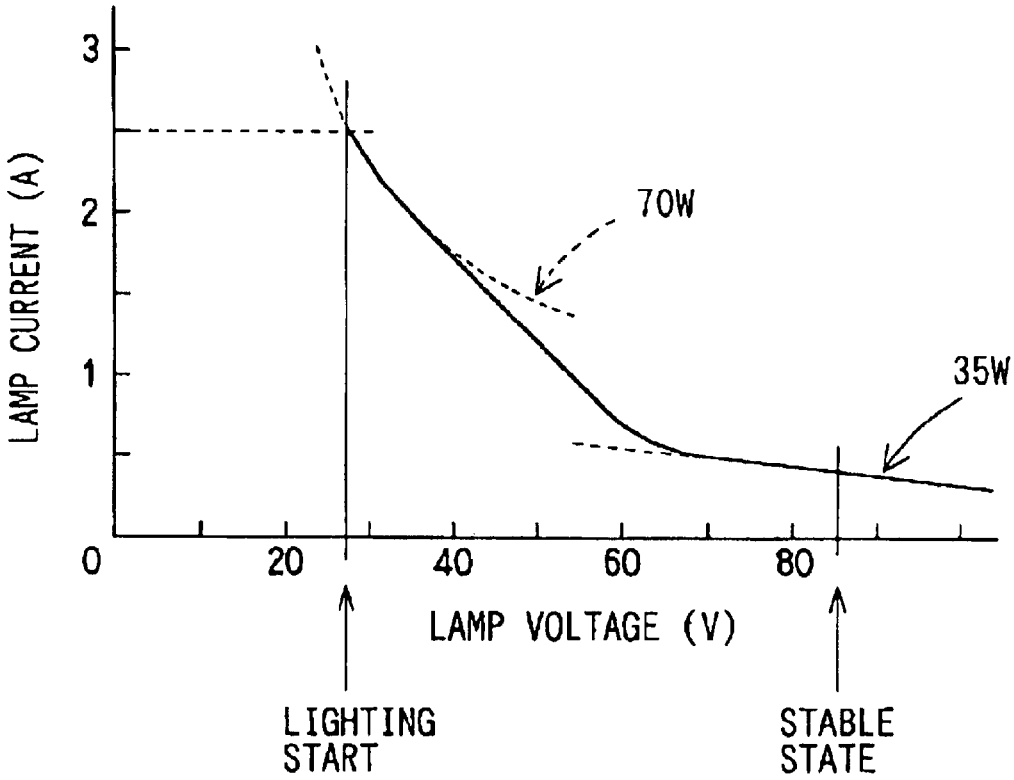
FIG. 13 RELATED ART
FIG. 13 is a control diagram illustrating a control characteristic between the lamp voltage and the lamp current according to a related art.

FIG. 10 illustrates another embodiment of the lighting start voltage storage circuit 320. In contrast with the lighting start voltage storage circuit 320 of FIG. 4, this lighting start voltage storage circuit 320 uses neither the switch 322 nor the switch control circuit 325, but uses a diode 326 while changing the connection of the capacitor 323. The capacitor 323 is connected to the reference power source Vr2, and holds the smallest value of the lamp voltage VL through the diode 326. The lamp voltage VL becomes the lowest in the initial stage of lighting and, at this moment, the light flux becomes the smallest. The voltage in the initial stage of lighting may be thus set by holding the lowest value of the lamp voltage VL.

As described above, the electric discharge lamp device according to the embodiments comprises storage means (lighting start voltage storage circuit 320) for storing a lamp voltage immediately after the start of lighting, and change detection means (change detection circuit 350) for detecting a change (ΔVL) in the lamp voltage by subtracting the lamp voltage signal immediately after the lighting stored in the storage means from the lamp voltage signal, wherein the electric power supplied to the lamp is controlled based upon change detected by the change detection means. This makes it possible to absorb fluctuation in the lamp voltage due to the individual lamps, to suppress the overshooting and undershooting of the light flux, and to smoothly converge the light flux to 100%.

Here, the storage means for storing the lamp voltage signal immediately after the start of lighting, may convert the lamp voltage from an analog value thereof to a digital value thereof, and may store it as a digital value using a microcomputer or the like. The change detection means for detecting a change (ΔVL) in the lamp voltage by subtracting the stored lamp voltage immediately after the lighting, may carry out the digital operation, too, by using a microcomputer or the like.

Further, a change (ΔVL) in the lamp voltage is detected by subtracting the lamp voltage signal immediately after the lighting from the present lamp voltage signal, the electric power supplied to the lamp is controlled depending upon ΔVL, and the electric power supplied to the lamp is gradually decreased by the timer circuit depending upon the elapse of time of from when ΔVL has exceeded a predetermined value, so as to be shifted to the electric power that is supplied to the lamp in a stable state, making it possible to absorb fluctuation in the lamp voltage due to the individual lamps, to suppress the overshooting and undershooting of the light flux, and to smoothly converge the light flux to 100%.

Further, after the elapse of a predetermined period of time from the start of lighting, the timer circuit gradually decreases the electric power supplied to the lamp, irrespective of ΔVL, so as to be shifted to the electric power that is supplied to the lamp in a stable state, making it possible to absorb fluctuation in the lamp voltage due to the individual lamps even at the re-lighting of the lamp, to suppress the overshooting and undershooting of the light flux, and to smoothly converge the light flux to 100%.

Further, after the elapse of a predetermined period of time set depending upon the turn-off time of before lighting the lamp, the timer circuit gradually decreases the electric power supplied to the lamp, making it possible to correctly control the electric power at the time of re-lighting without being affected by the electrode temperature of the lamp.

Further, a change ΔVL in the lamp voltage is detected by subtracting the lamp voltage signal immediately after the lighting of the lamp from the present lamp voltage signal, the electric power supplied to the lamp is controlled based upon ΔVL, and the electric power supplied to the lamp is gradually decreased by the timer circuit depending upon the elapse of time of from when ΔVL has exceeded a predetermined value or from when the lamp voltage VL has exceeded the predetermined value, which is earlier, so as to be shifted to the electric power that is supplied to the lamp in a stable state, making it possible to absorb fluctuation in the lamp voltage due to the individual lamps, to suppress the overshooting and undershooting of the light flux, and to smoothly converge the light flux to 100%.

The electric discharge lamp device of this invention makes it possible to absorb fluctuation in the lamp voltage due to the individual lamps and, particularly, due to the individual mercury-less lamps, to suppress the overshooting and undershooting of the light flux, and to smoothly converge the light flux to 100%.

What is claimed is:

1. An electric discharge lamp device comprising:

lamp voltage detection means for detecting a lamp voltage and producing a lamp voltage signal:

storage means for storing the lamp voltage signal produced from a lamp voltage detected immediately after a start of lighting a lamp; and change detection means for detecting a change in the lamp voltage by subtracting the lamp voltage signal stored in the storage means from the lamp voltage signal produced from a lamp voltage detected after the lamp voltage signal is stored in the storage means; and, control means for controlling electric power supplied to the lamp based upon the change detected by the change detection means.

2. An electric discharge lamp device as in claim 1, wherein the storage means stores the lamp voltage signal after an elapse of a predetermined period of time from the start of lighting the lamp *as the lamp voltage detected immediately after the start of lighting the lamp*.

3. An electric discharge lamp device as in claim 2, wherein the predetermined period of time is not longer than 6 seconds.

4. An electric discharge lamp device as in claim 3, wherein the lamp voltage signal stored in the storage means is a minimum voltage value in the predetermined period of time.

5. An electric discharge lamp device as in claim 1, further comprising:

a timer circuit for controlling the electric power supplied to the lamp depending upon an elapse of time after the start of lighting, wherein the timer circuit gradually decreases the electric power supplied to the lamp depending upon the elapse of time from when the change detected by the change detection means has exceeded a predetermined value to be shifted to the electric power that is supplied to the lamp in a stable state.

6. An electric discharge lamp device as in claim 5, wherein the timer circuit gradually decreases the electric power supplied to the lamp irrespective of the change of the lamp voltage signal after elapse of a predetermined period of time from the start of lighting.

7. An electric discharge lamp device as in claim 6, wherein the predetermined period of time is set depending upon a lamp turn-off time in which the lamp is maintained turned off.

8. An electric discharge lamp device as in claim 1, further comprising:

a timer circuit for controlling the electric power supplied to the lamp depending upon an elapse of time after the start of lighting, wherein the timer circuit gradually decreases the electric power supplied to the lamp depending upon the elapse of time from when the change detected by the change detection means has exceeded a predetermined value or from when a lamp voltage has exceeded the predetermined value, whichever is earlier, so as to be shifted to the electric power that is supplied to the lamp in a stable state.

9. An electric discharge lamp device as in claim 1, wherein the electric discharge lamp device is a mercury-free lamp device.

10. An electric discharge lamp device as in claim 9, wherein the mercury-free lamp device is mounted on a vehicle.

11. An electric discharge lamp device comprising:

a lamp voltage detection circuit for detecting a lamp voltage and producing a lamp voltage signal;

a storage circuit for storing the lamp voltage signal produced from a lamp voltage detected immediately after each start of lighting a lamp; and a change detection circuit for detecting a change in the lamp voltage by subtracting the lamp voltage signal stored in the storage circuit from a lamp voltage signal produced from a lamp voltage detected after the lamp voltage signal is stored in the storage circuit; and a controller for controlling electric power supplied to the lamp based upon the change detected by the change detection circuit.

12. An electric discharge lamp device comprising:

a storage circuit for storing a lamp voltage signal corresponding to a lamp voltage which is detected immediately after a start of lighting a lamp; and a change detection circuit for detecting a change in the lamp voltage by subtracting the lamp voltage signal stored in the storage circuit immediately after the lighting from the lamp voltage signal corresponding to the lamp voltage being detected currently, wherein electric power supplied to the lamp is controlled based upon the change detected by the change detection circuit;

wherein the storage circuit stores the lamp voltage signal after an elapse of a predetermined period of time from the start of lighting the lamp *as the lamp voltage detected immediately after the start of lighting the lamp*, the predetermined period of time not being longer than 6 seconds.

13. An electric discharge lamp device as in claim 12, wherein the lamp voltage signal stored in the storage circuit is a minimum voltage value in the predetermined period of time.

14. An electric discharge lamp device comprising:

a storage circuit for storing a lamp voltage signal corresponding to a lamp voltage which is detected immediately after a start of lighting a lamp;

a change detection circuit for detecting a change in the lamp voltage by subtracting the lamp voltage signal stored in the storage circuit immediately after the lighting from the lamp voltage signal corresponding to the lamp voltage being detected currently, electric power supplied to the lamp being controlled based upon the change detected by the change detection circuit; and a timer circuit for controlling the electric power supplied to the lamp depending upon an elapse of time after the start of lighting;

wherein the timer circuit gradually decreases the electric power supplied to the lamp depending upon the elapse of time from when the change detected by the change detection circuit has exceeded a predetermined value to be shifted to the electric power that is supplied to the lamp in a stable state;

wherein the timer circuit gradually decreases the electric power supplied to the lamp irrespective of the change of the lamp voltage signal after elapse of a predetermined period of time from the start of lighting.

15. An electric discharge lamp device as in claim 14, wherein the predetermined period of time is set depending upon a lamp turn-off time in which the lamp is maintained turned off.

16. An electric discharge lamp device comprising:

a storage circuit for storing a lamp voltage signal corresponding to a lamp voltage which is detected immediately after a start of lighting a lamp;

a change detection circuit for detecting a change in the lamp voltage by subtracting the lamp voltage signal stored in the storage circuit immediately after the lighting from the lamp voltage signal detected currently, electric power supplied to the lamp being controlled based upon the change detected by the change detection circuit; and a timer circuit for controlling the electric power supplied to the lamp depending upon an elapse of time after the start of lighting, wherein the timer circuit gradually decreases the electric power supplied to the lamp depending upon the elapse of time from when the change detected by the change detection circuit has exceeded a predetermined value or from when a lamp voltage has exceeded the predetermined value, whichever is earlier, so as to be shifted to the electric power that is supplied to the lamp in a stable state.

17. A method of operating an electric discharge lamp device, the method comprising:

detecting a lamp voltage and producing a lamp voltage signal corresponding to the detected lamp voltage;

storing the lamp voltage signal corresponding to the lamp voltage detected immediately after a start of lighting a lamp; and detecting a change in the lamp voltage by subtracting the stored lamp voltage signal from the lamp voltage signal corresponding to the lamp voltage detected after the lamp voltage is stored; and controlling electric power supplied to the lamp based upon the detected change.

18. A method as in claim 17, wherein the stored lamp voltage signal is stored after an elapse of a predetermined period of time from the start of lighting the lamp *as the lamp voltage detected immediately after the start of lighting the lamp*.

19. A method as in claim 18, wherein the predetermined period of time is not longer than 6 seconds.

20. A method as in claim 19, wherein the stored lamp voltage signal is a minimum voltage value in the predetermined period of time.

21. A method as in claim 17, further comprising controlling the electric power supplied to the lamp depending upon an elapse of time after the start of lighting, and gradually decreasing the electric power supplied to the lamp depending upon the elapse of time from when the detected change has exceeded a predetermined value to be shifted to the electric power that is supplied to the lamp in a stable state.

22. A method as in claim 21, wherein the electric power supplied to the lamp is gradually decreased irrespective of the change of the lamp voltage signal after elapse of a predetermined period of time from the start of lighting.

23. A method as in claim 22, wherein the predetermined period of time is set depending upon a lamp turn-off time in which the lamp is maintained turned off.

24. A method as in claim 17, further comprising:

controlling the electric power supplied to the lamp depending upon an elapse of time after the start of lighting, and gradually decreasing the electric power supplied to the lamp depending upon the elapse of time from when the detected change has exceeded a predetermined value or from when a lamp voltage has exceeded the predetermined value, whichever is earlier, so as to be shifted to the electric power that is supplied to the lamp in a stable state.

25. A method as in claim 17, wherein the electric discharge lamp device is a mercury-free lamp device.

26. A method as in claim 25, wherein the mercury-tree lamp device is mounted on a vehicle.

*27. An electric discharge lamp control device for a vehicle comprising:*

*present voltage detection means for detecting a present lamp voltage;*

*storage means for storing a lamp voltage signal indicating the lamp voltage detected immediately after a start of lighting a lamp; and*

*control means for controlling electric power supplied to the lamp based upon a change varying in dependence on the lamp voltage signal stored in the storage means and the lamp voltage detected by the present voltage detection means.*

*28. An electric discharge lamp control device as in claim 27, wherein the storage means is adapted to store the lamp voltage signal after an elapse of a predetermined period of time from the start of lighting the lamp as the lamp voltage detected immediately after the start of lighting the lamp.*

*29. An electric discharge lamp control device as in claim 28, wherein the predetermined period of time is not longer than 6 seconds.*

*30. An electric discharge lamp control device as in claim 29, wherein the lamp voltage signal stored in the storage means is a minimum voltage value in the predetermined period of time.*

*31. An electric discharge lamp control device as in claim 27, further comprising:*

*a timer circuit for controlling the electric power supplied to the lamp depending upon an elapse of time after the start of lighting,*

*wherein the timer circuit is adapted to gradually decrease the electric power supplied to the lamp depending upon*

*the elapse of time from when the change exceeds a predetermined value to be shifted to the electric power that is supplied to the lamp in a stable state.*

*32. An electric discharge lamp control device as in claim 31, wherein the timer circuit is adapted to gradually decrease the electric power supplied to the lamp irrespective of the change of the lamp voltage signal after elapse of a predetermined period of time from the start of lighting.*

*33. An electric discharge lamp control device as in claim 32, wherein the predetermined period of time is set depending upon a lamp turn-off time in which the lamp is maintained turned off.*

*34. An electric discharge lamp control device as in claim 27, further comprising:*

*a timer circuit for controlling the electric power supplied to the lamp depending upon an elapse of time after the start of lighting,*

*wherein the timer circuit is adapted to gradually decrease the electric power supplied to the lamp depending upon the elapse of time from when the change exceeds a predetermined value or from when a lamp voltage has exceeded the predetermined value, whichever is earlier, so as to be shifted to the electric power that is supplied to the lamp in a stable state.*

*35. An electric discharge lamp control device as in claim 27, wherein the electric discharge control lamp device is a mercury-free lamp control device.*

*36. An electric discharge lamp control device as in claim 27, wherein the electric discharge lamp control device is a device for controlling a mercury-free lamp mounted on a vehicle.*

*37. An electric discharge lamp control device as in claim 35, wherein the mercury-free lamp control device controls a mercury-free lamp which is mounted on a vehicle.*

*38. An electric discharge lamp control device for a vehicle as in claim 37, wherein the storage means is adapted to store the lamp voltage signal in an initial stage of lighting.*

*39. An electric discharge lamp control device as in claim 37, further comprising:*

*a DC power source for supplying the electric power to a lamp inverter circuit for driving the lamp with alternating current based on the electric power by the DC power source,*

*wherein the control means is adapted to control the electric power by controlling the DC power source supplied to the lamp inverter circuit.*

*40. An electric discharge lamp control device for a vehicle as in claim 37, wherein the control means is adapted to decrease the electric power supplied to the lamp in response to an increase of the change.*

*41. An electric discharge lamp control device as in claim 37, wherein the control means is adapted to start decreasing the electric power supplied to the lamp in response to a larger decreasing rate at a time that the change has reached a predetermined fixed value, the larger decreasing rate being larger than a decreasing rate until the change reaches the predetermined fixed value.*

*42. An electric discharge lamp control device as in claim 40, further comprising:*

*judging means for judging whether it is a hot start or cold start when lighting the lamp is started,*

*wherein the control means is adapted to decrease the electric power supplied to the lamp, before the change reaches the predetermined fixed value based on the judgment as the cold start.*

*43. An electric discharge lamp control device as in claim 42, wherein the judging means is adapted to judge as the hot start in the case that the lamp voltage detected by the present voltage detection means becomes larger than a predetermined value, before the change reaches the predetermined fixed value.*

*44. An electric discharge lamp control device as in claim 42, wherein the judging means is adapted to judge as the hot start when an elapsed time from the lamp lighting becomes longer than a predetermined threshold, before the change becomes larger than the predetermined fixed value.*

*45. An electric discharge lamp control device as in claim 44, wherein the predetermined threshold corresponds to a length of a turn-off period before lighting.*

*46. An electric discharge lamp control device for a vehicle comprising:*

*a lamp voltage detection circuit for detecting a lamp voltage and producing a lamp voltage signal;*

*a storage circuit for storing the lamp voltage signal produced from a lamp voltage detected immediately after each start of lighting a lamp; and*

*a controller for controlling electric power supplied to the lamp based upon a change varying in dependence on the lamp voltage signal stored by the storage circuit and a lamp voltage signal detected by the lamp voltage detection circuit after the lamp voltage signal is stored by the storage circuit.*

*47. An electric discharge lamp control device for a vehicle comprising:*

*a storage circuit for storing a lamp voltage signal corresponding to a lamp voltage which is detected immediately after a start of lighting a lamp; and*

*a change detection circuit for detecting a change in the lamp voltage based on the lamp voltage signal stored in the storage circuit immediately after the lighting and the lamp voltage signal corresponding to the lamp voltage being detected currently,*

*wherein electric power supplied to the lamp is controlled based upon the change detected by the change detection circuit;*

*wherein the storage circuit stores the lamp voltage signal after an elapse of a predetermined period of time from the start of lighting the lamp as the lamp voltage detected immediately after the start of lighting the lamp, the predetermined period of time not being longer than 6 seconds.*

*48. An electric discharge lamp control device as in claim 47, wherein the lamp voltage signal stored in the storage circuit is a minimum voltage value in the predetermined period of time.*

*49. An electric discharge lamp control device for a vehicle comprising:*

*a storage circuit for storing a lamp voltage signal corresponding to a lamp voltage which is detected immediately after a start of lighting a lamp;*

*a change detection circuit for detecting a change in the lamp voltage between the lamp voltage signal stored in the storage circuit immediately after the lighting and the lamp voltage signal corresponding to the lamp voltage being detected currently, electric power supplied to the lamp being controlled based upon the change detected by the change detection circuit; and*

*a timer circuit for controlling the electric power supplied to the lamp depending upon an elapse of time after the start of lighting;*

*wherein the timer circuit gradually decreases the electric power supplied to the lamp depending upon the elapse*

*of time from when the change detected by the change detection circuit exceeds a predetermined value to be shifted to the electric power that is supplied to the lamp in a stable state;*

*wherein the timer circuit gradually decreases the electric power supplied to the lamp irrespective of the change of the lamp voltage signal after elapse of a predetermined period of time from the start of lighting.*

*50. An electric discharge lamp control device as in claim 49, wherein the predetermined period of time is set depending upon a lamp turn-off time in which the lamp is maintained turned off.*

*51. An electric discharge lamp control device for a vehicle comprising:*

*a storage circuit for storing a lamp voltage signal corresponding to a lamp voltage which is detected immediately after a start of lighting a lamp;*

*a change detection circuit for detecting a change in the lamp voltage varying with the lamp voltage signal stored in the storage circuit immediately after the lighting and the lamp voltage signal detected currently, electric power supplied to the lamp being controlled based upon the change detected by the change detection circuit; and*

*a timer circuit for controlling the electric power supplied to the lamp depending upon an elapse of time after the start of lighting,*

*wherein the timer circuit gradually decreases the electric power supplied to the lamp depending upon the elapse of time from when the change detected by the change detection circuit has exceeded a predetermined value or from when a lamp voltage has exceeded the predetermined value, whichever is earlier, so as to be shifted to the electric power that is supplied to the lamp in a stable state.*

*52. A method of operating an electric discharge lamp device, the method comprising:*

*detecting a lamp voltage and producing a lamp voltage signal corresponding to the detected lamp voltage;*

*storing the lamp voltage signal corresponding to the lamp voltage detected immediately after a start of lighting a lamp; and*

*controlling electric power supplied to the lamp based upon a change varying in dependence on the lamp voltage signal stored and the lamp voltage signal detected after the storing.*

*53. A method as in claim 52, wherein the stored lamp voltage signal is stored after an elapse of a predetermined period of time from the start of lighting the lamp as the lamp voltage detected immediately after the start of lighting the lamp.*

*54. A method as in claim 53, wherein the predetermined period of time is not longer than 6 seconds.*

*55. A method as in claim 54, wherein the stored lamp voltage signal is a minimum voltage value in the predetermined period of time.*

*56. A method as in claim 52, wherein the controlling controls the electric power supplied to the lamp further based upon an elapse of time after the start of lighting, and gradually decreases the electric power supplied to the lamp depending upon the elapse of time from when the change has exceeded a predetermined value to be shifted to the electric power that is supplied to the lamp in a stable state.*

*57. A method as in claim 56, wherein the electric power supplied to the lamp is gradually decreased irrespective of the change of the lamp voltage signal after elapse of a predetermined period of time from the start of lighting.*

*58. A method as in claim 57, wherein the predetermined period of time is set depending upon a lamp turn-off time in which the lamp is maintained turned off.*

*59. A method as in claim 52, further comprising:*

*controlling the electric power supplied to the lamp depending upon an elapse of time after the start of lighting, and gradually decreasing the electric power supplied to the lamp depending upon the elapse of time from when the change has exceeded a predetermined value or from when a lamp voltage has exceeded the predetermined value, whichever is earlier, so as to be shifted to the electric power that is supplied to the lamp in a stable state.*

*60. A method as in claim 52, wherein the electric discharge lamp device is a mercury-free lamp device mounted on a vehicle.*

*61. A mercury-free electric discharge lamp control device for a vehicle comprising:*

*present voltage detection means for detecting a present lamp voltage supplied to a mercury-free electric discharge lamp;*

*storage means for storing a lamp voltage at a time of a start of an initial stage of lighting the lamp; and*

*control means for decreasing electric power supplied to the lamp in accordance with time when a change between the stored lamp voltage and the present lamp voltage reaches a first predetermined fixed value.*

*62. A mercury-free electric discharge lamp control device according to claim 61, wherein the stored lamp voltage represents a lamp voltage held after elapse of a predetermined period of time during the initial stage of lighting the lamp as the lamp voltage at the time of the start of the initial stage of lighting the lamp.*

*63. The mercury-free electric discharge lamp control device according to claim 61, wherein the stored lamp voltage represents a lowest lamp voltage held during the initial stage of lighting the lamp.*

*64. The mercury-free electric discharge lamp control device according to claim 61, wherein the control means is adapted to decrease the electric power supplied to the lamp when the change between the stored lamp voltage and the present lamp voltage reaches the first predetermined fixed value, if a predetermined time elapses after the change has reached the first predetermined fixed value.*

*65. The mercury-free electric discharge lamp control device according to claim 61, wherein the control means is adapted to decrease the electric power supplied to the lamp, if a predetermined time elapses before the change has reached the first predetermined fixed value.*

*66. The mercury-free electric discharge lamp control device according to claim 61, wherein the control means is adapted to decrease the electric power supplied to the lamp when the change between the stored lamp voltage and the present lamp voltage reaches a first predetermined fixed value, if the present voltage reaches a second predetermined fixed value after the change has reached the first predetermined fixed value.*

*67. The mercury-free electric discharge lamp control device according to claim 61, wherein the control means is adapted to decrease the electric power supplied to the lamp, if the present voltage reaches a second predetermined fixed value before the change has reached the first predetermined fixed value.*

*68. A mercury-free electric discharge lamp control device for a vehicle comprising:*

*judging means for judging whether a light flux of a lamp reaches a value in relation to substantially 80% or more of the maximum light flux; and*

*control means for controlling electric power supplied to the lamp in accordance with time, when the judging means affirms the value having reached in relation to substantially 80% or more of the maximum light flux.*

*69. The mercury-free electric discharge lamp control device according to claim 68, further comprising:*

*determination means for determining the light flux by relating a stored lamp voltage stored in an initial stage of lighting the lamp with a present lamp voltage.*

*70. The mercury-free electric discharge lamp control device according to claim 69, wherein the stored lamp voltage represents a lamp voltage sample-held after elapse of a predetermined period of time during the initial stage of lighting the lamp.*

*71. The mercury-free electric discharge lamp control device according to claim 69, wherein the stored lamp voltage represents a lowest lamp voltage sample-held during the initial stage of lighting the lamp.*

*72. A mercury-free electric discharge lamp control device for a vehicle comprising:*

*a control circuit for decreasing electric power supplied to the lamp in accordance with time in relation to a level of light flux of the lamp;*

*wherein the level of the light flux is identified by a change of the lamp voltage becoming a fixed value substantially, the change being a difference between a lamp voltage stored immediately after a start of an initial stage of lighting the lamp and a present lamp voltage.*

*73. The mercury-free electric discharge lamp control device according to claim 72, wherein the stored lamp voltage represents a lamp voltage sample-held after elapse of a predetermined period of time during the initial stage of lighting the lamp.*

*74. The mercury-free electric discharge lamp control device according to claim 72, wherein the stored lamp voltage represents a lowest lamp voltage sample-held during the initial stage of lighting the lamp.*

*75. A mercury-free electric discharge lamp control device for a vehicle comprising:*

*means for providing a first threshold value and a second threshold value, which is larger than the first threshold value;*

*control means for controlling electric power supplied to a lamp based on a change between a lamp voltage stored immediately after a start of an initial stage of lighting the lamp and a present lamp voltage, wherein*

*the control means is adapted to compare the first threshold value with the change so as to suppress overshoot of the light flux, and to compare the second threshold value with the change so as to suppress undershoot of the light flux, such that the electric power supplied to the lamp is controlled in accordance with a comparison result of the comparison to the first threshold value and the comparison to the second threshold value.*

*76. The mercury-free electric discharge lamp control device according to claim 75, wherein the stored lamp voltage represents a lamp voltage sample-held after elapse of a predetermined period of time during the initial stage of lighting the lamp as the lamp voltage stored immediately after the start of the initial stage of lighting the lamp.*

*77. The mercury-free electric discharge lamp control device according to claim 75, wherein the stored lamp voltage represents a lowest lamp voltage sample-held during the initial stage of lighting the lamp.*

*78. The mercury-free electric discharge lamp control device according to claim 75,*

*wherein, if the comparison result indicates that the change is smaller than the first threshold value,*

*the control means supplies a first constant power to the lamp,*

*if the comparison result indicates that the change is greater than the first threshold value but smaller than the second threshold value,*

*the control means decreases the power supplied to the lamp in accordance with the change, and*

*if the comparison result indicates that the change is greater than the second threshold value,*

*the control means supplies a constant second power smaller than the first power to the lamp.*

*79. A mercury-free electric discharge lamp control device for a vehicle comprising:*

*means for providing a threshold value;*

*control means for controlling electric power supplied to a lamp based on a change between a lamp voltage stored immediately after a start of an initial stage of lighting the lamp and a present lamp voltage, wherein*

*the control means is adapted to compare the threshold value with the change so as to suppress undershoot of light flux of the lamp, such that the electric power supplied to the lamp is controlled in accordance with the comparison result.*

*80. The mercury-free electric discharge lamp control device according to claim 79, wherein the stored lamp voltage represents a lamp voltage sample-held after elapse of a predetermined period of time during the initial stage of lighting the lamp as the lamp voltage stored immediately after the start of the initial stage of the lighting the lamp.*

*81. The mercury-free electric discharge lamp control device according to claim 79, wherein the stored lamp voltage represents a lowest lamp voltage sample-held during the initial stage of lighting the lamp.*

*82. The mercury-free electric discharge lamp control device according to claim 79,*

*if the comparison result indicates that the change is smaller than the threshold value,*

*the control means decreases the power supplied to the lamp in accordance with the change, and*

*if the comparison result indicates that the change is greater than the threshold value,*

*the control means supplies a constant power to the lamp.*

*83. An electric discharge lamp control device as in claim 46, wherein the electric discharge control lamp device is a mercury-free lamp control device.*

*84. An electric discharge lamp control device as in claim 46, wherein the electric discharge lamp control device is a device for controlling a mercury-free lamp mounted on a vehicle.*

*85. An electric discharge lamp control device as in claim 83, wherein the mercury-free lamp control device controls a mercury-free lamp which is mounted on a vehicle.*

*86. An electric discharge lamp control device as in claim 47, wherein the electric discharge control lamp device is a mercury-free lamp control device.*

*87. An electric discharge lamp control device as in claim 47, wherein the electric discharge lamp control device is a device for controlling a mercury-free lamp mounted on a vehicle.*

*88. An electric discharge lamp control device as in claim 86, wherein the mercury-free lamp control device controls a mercury-free lamp which is mounted on a vehicle.*

*89. An electric discharge lamp control device as in claim 49, wherein the electric discharge control lamp device is a mercury-free lamp control device.*

*90. An electric discharge lamp control device as in claim 49, wherein the electric discharge lamp control device is a device for controlling a mercury-free lamp mounted on a vehicle.*

*91. An electric discharge lamp control device as in claim 89, wherein the mercury-free lamp control device controls a mercury-free lamp which is mounted on a vehicle.*

*92. An electric discharge lamp control device as in claim 51, wherein the electric discharge control lamp device is a mercury-free lamp control device.*

*93. An electric discharge lamp control device as in claim 51, wherein the electric discharge lamp control device is a device for controlling a mercury-free lamp mounted on a vehicle.*

*94. An electric discharge lamp control device as in claim 92, wherein the mercury-free lamp control device controls a mercury-free lamp which is mounted on a vehicle.*

*95. An electronic discharge lamp device as in claim 1, wherein the lamp voltage signal stored in the storage means as the lamp voltage detected immediately after a start of lighting a lamp is a minimum value of the lamp voltage detected by the lamp voltage detection means in a predetermined period of time from the start of lighting a lamp.*

*96. An electronic discharge lamp device as in claim 27, wherein the control means is configured to continue to use the lamp voltage signal stored in the storage means in determining the change during control of the electric power.*

*97. An electric discharge lamp control device as in claim 96, wherein the storage means is adapted to store the lamp voltage signal after an elapse of a predetermined period of time from the start of lighting the lamp as the lamp voltage detected immediately after the start of lighting the lamp.*

*98. An electric discharge lamp control device as in claim 97, wherein the predetermined period of time is not longer than 6 seconds.*

*99. An electric discharge lamp control device for a vehicle comprising:*

*present voltage detection means for detecting a present lamp voltage;*

*storage means for storing a lamp voltage signal indicating the lamp voltage detected immediately after a start of lighting a lamp; and*

*control means for controlling electric power supplied to the lamp based upon a change varying in dependence on the lamp voltage signal stored in the storage means and the lamp voltage detected by the present voltage detection means;*

*wherein the lamp voltage signal stored in the storage means is substantially minimum voltage value in a predetermined period of time from the start of lighting the lamp.*

*100. A method of operating an electric discharge lamp device, the method comprising:*

*detecting a lamp voltage and producing a lamp voltage signal corresponding to the detected lamp voltage;*

*storing the lamp voltage signal corresponding to the lamp voltage detected immediately after a start of lighting a lamp; and*

*controlling electric power supplied to the lamp based upon a change varying in dependence on the lamp voltage signal stored and the lamp voltage signal detected after the storing;*

*wherein the stored lamp voltage signal is substantially a minimum voltage value in a predetermined period of time from the start of lighting the lamp.*

*101. A mercury-free electric discharge lamp control device according to claim 72, wherein the change is continuously calculated as the difference of the present lamp voltage from the stored lamp voltage.*

*102. A mercury-free electric discharge lamp control device for a vehicle comprising:*

*a control circuit for controlling a decreased amount of electric power supplied to a mercury-free lamp in accordance with time in relation to a level of light flux of the lamp,*

*wherein the level of the light flux is identified by a change of the lamp voltage becoming a fixed value substantially, the change being a difference between an initial lamp voltage of the mercury-free lamp detected and stored after a start of an initial stage of lighting the lamp and a present lamp voltage of the mercury-free lamp detected after detection of the initial lamp voltage.*

*103. A mercury-free electric discharge lamp control device according to claim 102, wherein the initial lamp voltage corresponds to a lowest lamp voltage sample-held during the initial stage of lighting the mercury-free lamp.*

*104. A mercury-free electric discharge lamp control device for a vehicle comprising:*

*means for providing a first threshold value and a second threshold value, which is larger than the first threshold value;*

*control means for controlling electric power supplied to a lamp based on a change between a lamp voltage stored at time of a start of an initial stage of lighting the lamp and a present lamp voltage, wherein*

*the control means is adapted to compare the first threshold value with the change so as to suppress overshoot of the light flux, and to compare the second threshold value with the change so as to suppress undershoot of the light flux, such that the electric power supplied to the lamp is controlled in accordance with a comparison result of the comparison to the first threshold value and the comparison to the second threshold value.*

*105. A mercury-free electric discharge lamp control device according to claim 79, wherein the change is continuously calculated as the difference of the present lamp voltage from the stored lamp voltage.*

*106. An electric discharge lamp control device for a vehicle comprising:*

*a present voltage detection part configured to detect a present voltage of a mercury-free lamp;*

*a storage part configured to store an initial voltage of the mercury-free lamp in an initial stage of lighting the mercury-free lamp; and*

*a control part configured to control electric power supplied to the mercury-free lamp based on a change of the present voltage relative to the initial voltage stored in the storage part.*

*107. An electric discharge lamp control device according to claim 106, wherein the change is increased as the present voltage increases after the initial stage of lighting.*

*108. An electric discharge lamp control device according to claim 106, wherein the storage part is configured to store, as the initial voltage, a substantially minimum voltage of the present voltage detected in the initial stage of lighting the mercury-free lamp by the present voltage detection part.*

*109. An electric discharge lamp control device according to claim 106, wherein the control part is configured to perform electric power decrease control for the mercury-free lamp based on the change.*

*110. An electric discharge lamp control device for a vehicle comprising:*

*a present voltage detection part configured to detect a present voltage of a mercury-free lamp;*

*a storage part configured to store an initial voltage of the mercury-free lamp at an initial stage of lighting the mercury-free lamp;*

*a change calculating part configured to calculate a change of the present voltage relative to the initial voltage stored in the storage part; and*

*a control part configured to control electric power supplied to the mercury-free lamp in accordance with time at which the change reaches a predetermined value.*

*111. An electric discharge lamp control device according to claim 110, wherein the change is increased as the present voltage increases after the initial stage of lighting.*

*112. An electric discharge lamp control device according to claim 110, wherein the storage part is configured to store, as the initial voltage, a substantially minimum voltage of the present voltage detected in the initial stage of lighting the mercury-free lamp by the present voltage detection part.*

*113. An electric discharge lamp control device according to claim 110, wherein the control part is configured to perform electric power decrease control for the mercury-free lamp based on the change.*

*114. An electric discharge lamp control device according to claim 110, wherein:*

*the control part is configured to control the electric power to suppress overshoot of the electric power based on the predetermined value; and*

*the control part is further configured to control the electric power to suppress undershoot of the electric power based on another predetermined value different from the predetermined value provided for overshoot suppression.*

*115. An electric discharge lamp control device for a vehicle comprising:*

*a present voltage detection part configured to detect a present voltage of a mercury-free lamp;*

*a storage part configured to store a substantially minimum voltage value detected by the present voltage detection part in an initial stage of lighting the mercury-free lamp; and*

*a control part configured to control electric power supplied to the mercury-free lamp based on a change of the present voltage relative to the substantially minimum voltage value stored in the storage part.*

*116. An electric discharge lamp control device according to claim 115, wherein the change is increased as the present voltage increases after the initial stage of lighting.*

*117. An electric discharge lamp control device according to claim 115, wherein the control part is configured to perform electric power decrease control for the mercury-free lamp based on the change.*

*118. An electric discharge lamp control device for a vehicle comprising:*

*a present voltage detection part configured to detect a present voltage of a mercury-free lamp;*

*a storage part configured to store a substantially minimum voltage value detected by the present voltage detection part in an initial stage of lighting the mercury-free lamp; and*

*a control part configured to control electric power supplied to the mercury-free lamp based on the substantially minimum voltage value and the present voltage value thereby to suppress overshoot of light flux of the mercury-free lamp.*

* * * * *